US008384556B2

United States Patent
Ko et al.

(10) Patent No.: US 8,384,556 B2
(45) Date of Patent: Feb. 26, 2013

(54) SOLAR POWERED LIGHT AND ALARM SYSTEM

(76) Inventors: Gordon Ko, Phillips Ranch, CA (US); Lance Dean, Colleyville, TX (US)

( * ) Notice: Subject to any disclaimer, the term of this patent is extended or adjusted under 35 U.S.C. 154(b) by 405 days.

(21) Appl. No.: 12/764,577

(22) Filed: Apr. 21, 2010

(65) Prior Publication Data
US 2011/0260880 A1    Oct. 27, 2011

(51) Int. Cl.
*G08B 21/00* (2006.01)
*G08B 5/00* (2006.01)
*F21L 4/00* (2006.01)
*F21V 23/04* (2006.01)
*B60Q 1/26* (2006.01)

(52) U.S. Cl. ............... 340/686.1; 362/183; 362/276; 362/541; 340/332

(58) Field of Classification Search ............ 340/686.1; 362/183, 276
See application file for complete search history.

(56) References Cited

U.S. PATENT DOCUMENTS

| | | | | | |
|---|---|---|---|---|---|
| 36,790 | A | * | 10/1862 | Northrup | 295/44 |
| 4,703,171 | A | * | 10/1987 | Kahl et al. | 250/221 |
| 5,211,470 | A | * | 5/1993 | Frost et al. | 362/183 |
| 5,680,033 | A | * | 10/1997 | Cha | 359/542 |
| 6,086,218 | A | * | 7/2000 | Robertson | 362/157 |
| 6,120,165 | A | * | 9/2000 | Shalvi | 362/276 |
| 7,972,048 | B1 | * | 7/2011 | Lamborn | 362/541 |
| 2006/0076047 | A1 | * | 4/2006 | Green et al. | 136/243 |
| 2006/0232962 | A1 | * | 10/2006 | Altman | 362/227 |
| 2009/0168411 | A1 | * | 7/2009 | Yen | 362/183 |
| 2011/0012552 | A1 | * | 1/2011 | Margalit | 320/101 |
| 2012/0020060 | A1 | * | 1/2012 | Myer et al. | 362/183 |

* cited by examiner

*Primary Examiner* — George Bugg
*Assistant Examiner* — Jack K Wang
(74) *Attorney, Agent, or Firm* — Ober, Kaler, Grimes & Shriver; Royal W. Craig (57) ABSTRACT

An elliptically housed solar powered intrusion detection/notification device having a flashing LED light source and audible human voice alarm activated by a passive infrared (PIR) sensor motion detector in conjunction with a battery recharged via surface mounted photovoltaic cells, and a control circuit coupled to the light source/alarm, the PIR motion detector and the battery.

11 Claims, 6 Drawing Sheets

SOLAR POWERED LIGHT AND ALARM SYSTEM

BACKGROUND OF THE INVENTION

1. Field of the Invention

The present invention relates generally to security devices. More specifically, the present invention is directed to a solar powered security system providing localized illumination and audible detection notification utilizing infrared intrusion detection.

2. Description of the Background

Figure 1:
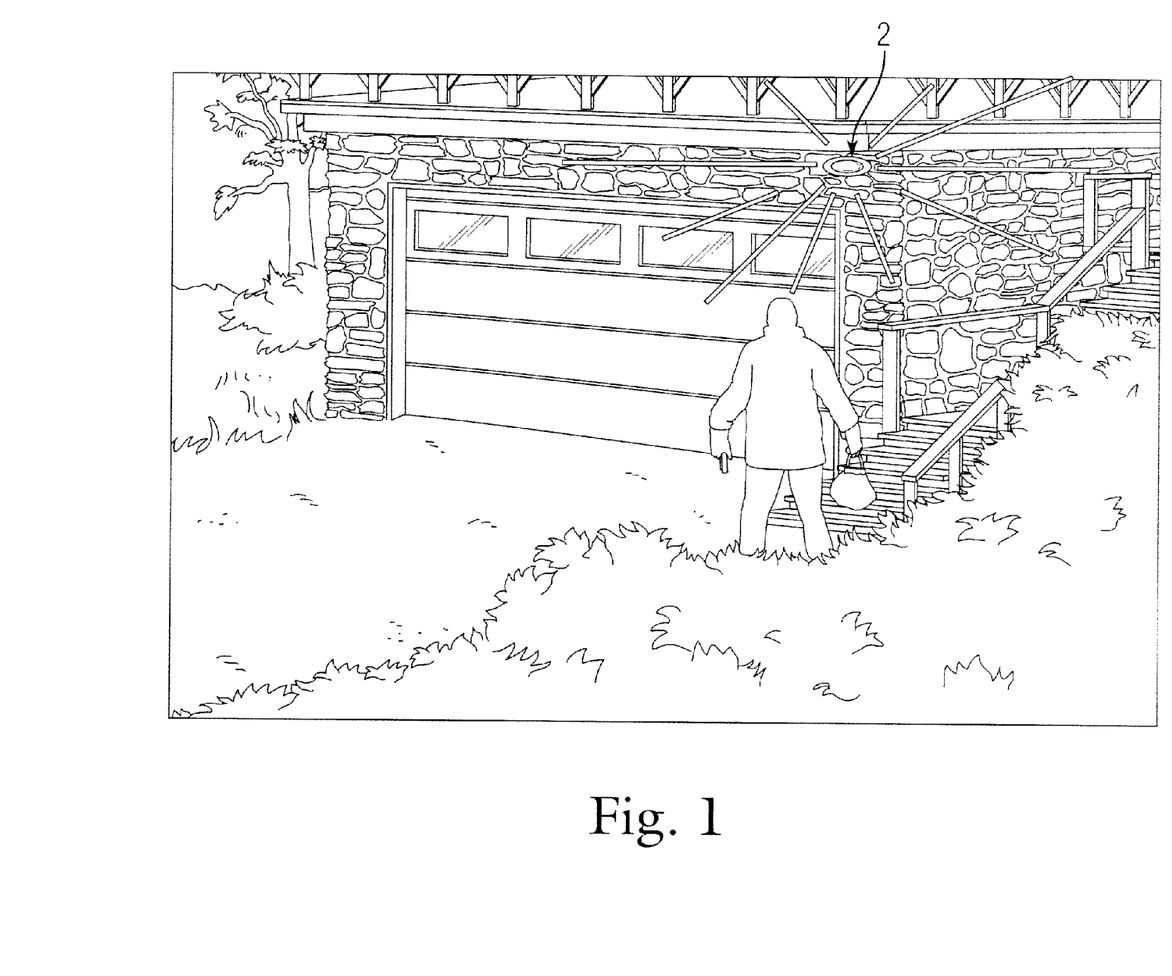
FIG. 1 is a perspective view of a preferred embodiment of the security system 2 attached below the eaves of a house.

Residential security systems are commonplace in modern homes and typically incorporate a series of sensors to detect the presence of an intruder, plus an indicator for alerting both the intruder and the homeowner or neighbors that a threat has been detected. Home intruders such as burglars typically rely on stealth to complete their crime rather than risk confrontation and apprehension. Consequently, as seen in FIG. 1, when intruders are notified that they have detected they are usually deterred from continuing their crime.

Where a new home is being constructed it is relatively easy to provide 120 VAC electrical power to locations where an intrusion detection/notification device may be desirable. However, in existing homes it may be costly or impossible, especially when needed to extend a power to remote locations like sheds, barns, mailboxes and driveways or to other exterior location such as gardens (where animal intruders destroy crops or decorative plantings). Moreover, 120 VAC security lights have been known to be tripped, power cut, damage, stolen, etc. With a solar-powered security light, the light can be placed anywhere away from where intruders. Thus a solar-powered light is 100% maintenance free with no energy costs.

There are known solar powered lighting devices including U.S. Pat. Nos. 4,782,432; 4,823,241; 5,211,470; 5,217,296, and the present inventor's own U.S. Pat. No. 20080218088 which describes an easily deployable miniature, LED light unit specifically for home security yard signs.

While the foregoing devices fulfill their particular objectives none disclose a solar-powered lighting solution with intrusion detection/notification capabilities, that is miniaturized and housed in a suspension-type housing for unobtrusive mounting under the eaves or awnings of residential houses. Such a device should be inexpensive, durable, lightweight, compact, portable and efficient. Moreover, since the device must brightly illuminate a wide area a particular solar-charging miniature LED array is most appropriate that remains off while charging during the day, and illuminates at night, all night.

The present system provides a self contained intrusion detection/notification device with unique sensor, optical, and electronic systems capable of responding only to radiation from an intruder to announce them using audio and/or visual indicators.

BRIEF DESCRIPTION OF THE DRAWINGS

The objects, features, and advantages of the present invention will become apparent from the following detailed description of the preferred embodiments and certain modifications thereof when taken together with the accompanying drawings in which like numbers represent like items throughout and in which.

DETAILED DESCRIPTION OF THE PREFERRED EMBODIMENT

For the purposes of promoting an understanding of the principles of the invention, reference will now be made to the exemplary embodiment illustrated in the drawings and described below. The embodiment disclosed is not intended to be exhaustive or limit the invention to the precise form disclosed in the following detailed description. Rather, the embodiment is chosen and described so that others skilled in the art may utilize its teachings. It will be understood that no limitation of the scope of the invention is thereby intended. The invention includes any alterations and modifications in the illustrated device, the methods of operation, and further applications of the principles of the invention which would normally occur to one skilled in the art to which the invention relates.

The invention is a self-contained intrusion detection and enunciation device that utilizes an optical platform employing low power infrared sensing technologies to identify intrusion threats and automatically announce them by illuminating the monitored area, and by providing an audible, verbal announcement to the intruder that his presence has been noticed.

As seen in FIG. 1, a preferred embodiment of the system 2 is shown which may be readily attached in a suspended configuration below the eaves or awnings of a house, or may be attached to walls, fences, etc. The system 2 employs a passive infrared (PIR) sensing device to detect intruders and illuminate a high-intensity LED array and audio-enunciator circuit to deter them, a self-sustaining solar charging battery circuit for powering the foregoing, all of which enclosed in a low-profile elliptical housing with wide-angle Fresnel lens. The foregoing components are herein described in detail.

Figure 2:
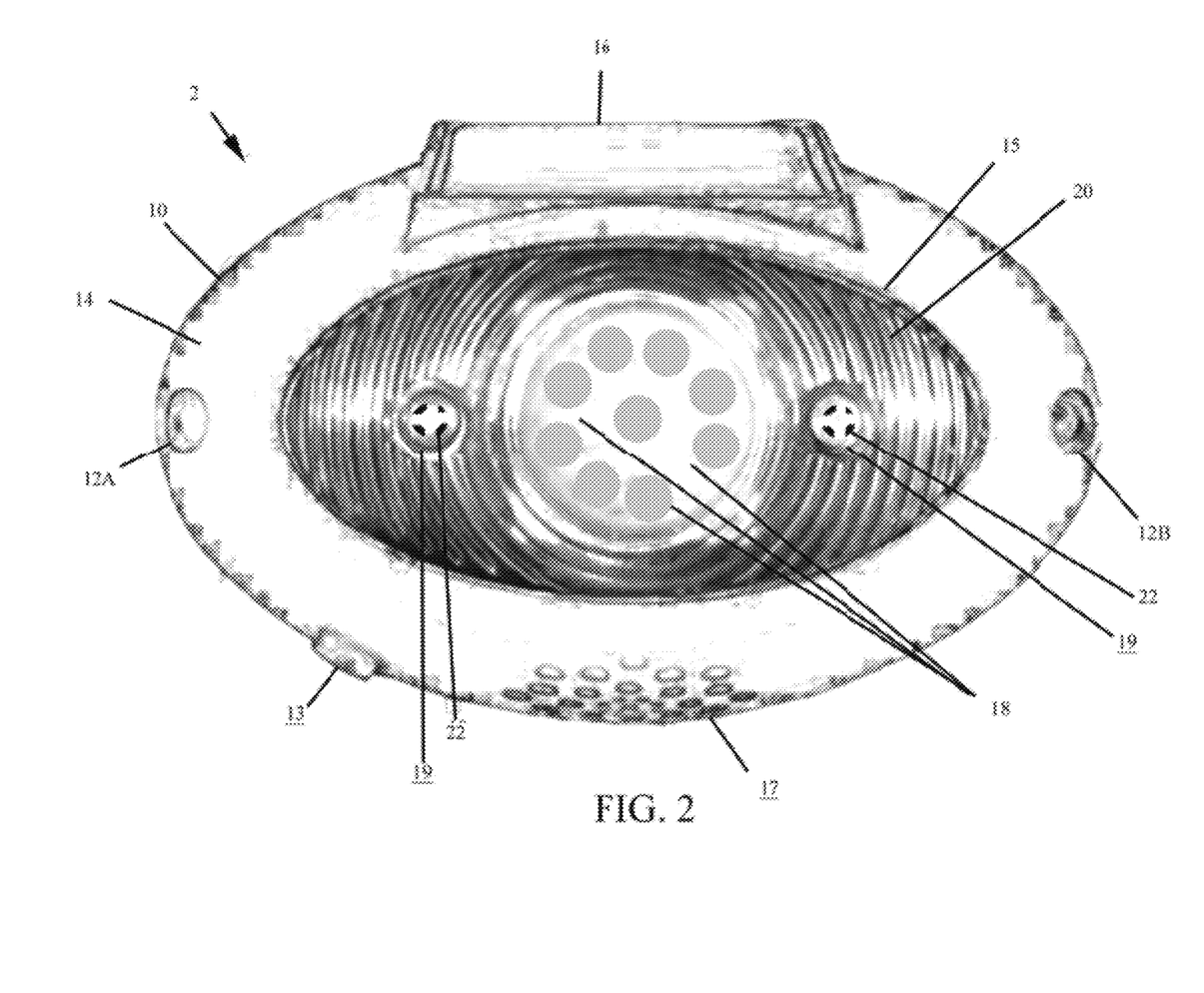
FIG. 2 is a front perspective view of a system 2 according to the present invention.
Figure 3:
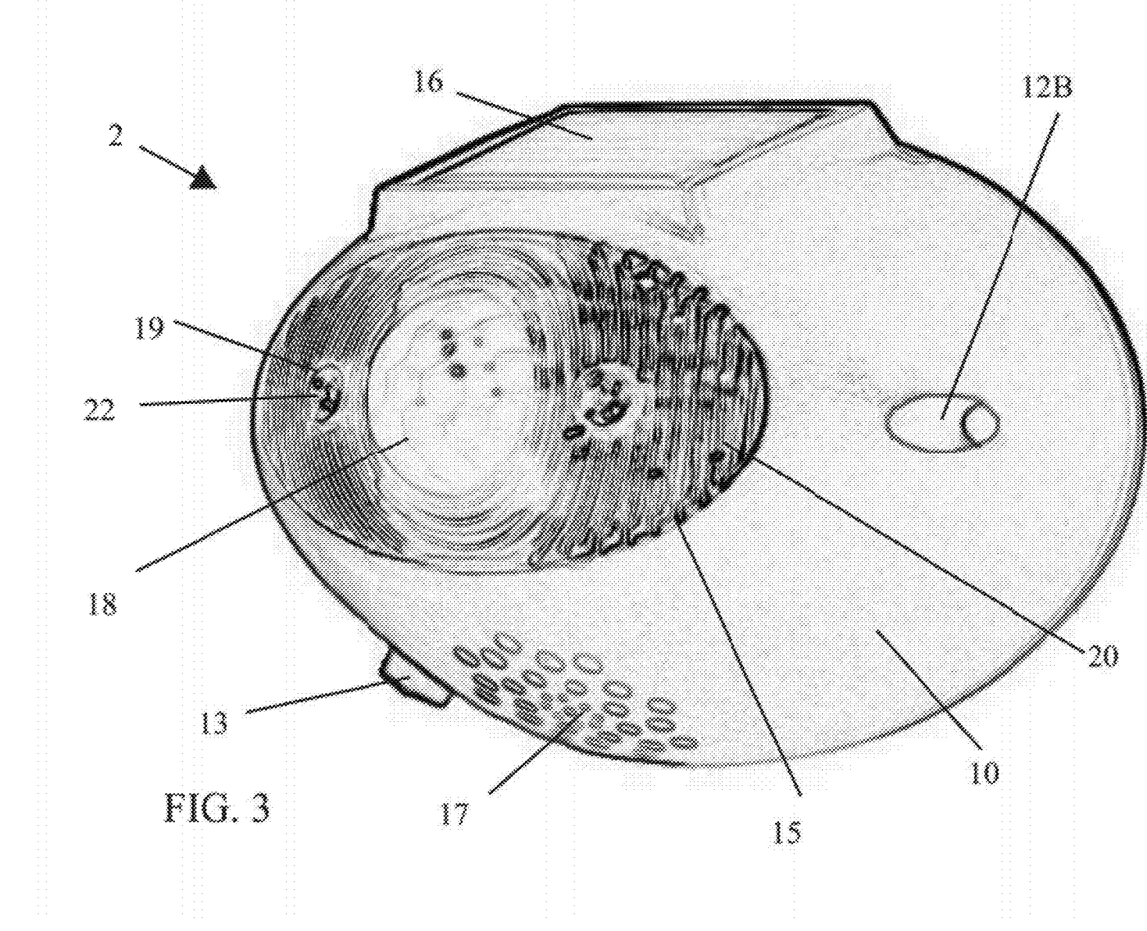
FIG. 3 is a front perspective view of a system 2 according to the present invention.
Figure 4:
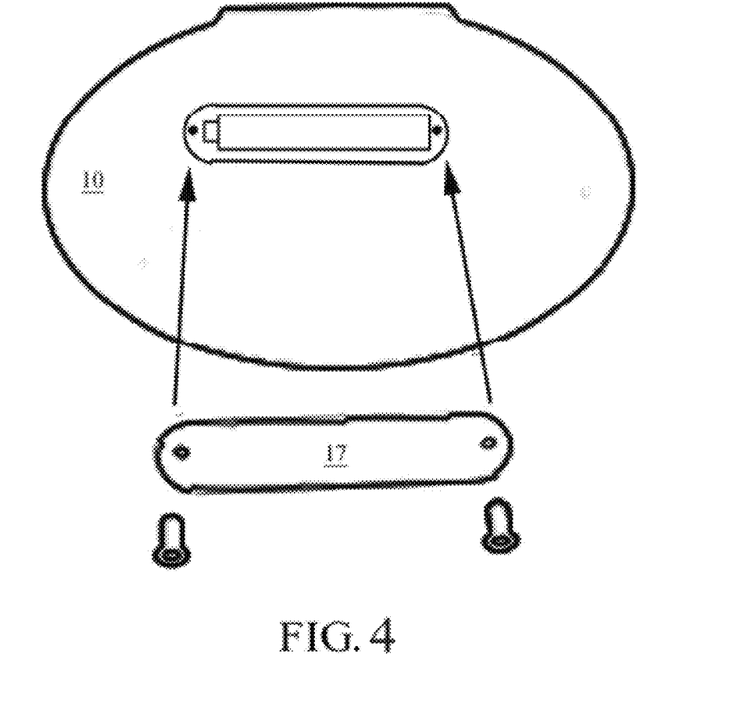
FIG. 4 is a back-view of the system 2.

As seen in FIGS. 2 and 3, the low-profile elliptical housing 10 contains and protects all the system components. Housing 10 is a unitary composite-polymer enclosure preferably formed in a one-shot open-molding process to define a substantially elliptical form factor with a flattened back surface area (obscured, see FIG. 4), elliptical side walls 14 and elliptical frontal aperture 15. The housing 10 is preferably formed from a tough, weather resistant and impact resistance polymer such as acrylonitrile butadiene styrene (ABS) plastic or a similar polymer that may color modified to a preferred color to match (or contrast) residential architectural elements and may be modified to enhance resistance to UV light degradation.

The housing 10 has a generally semi-circular cross-section around the horizontal axis and an elliptical cross section about the vertical axis providing a semi-spherical enclosure which permits a 120° arc of monitored space without obstruction from the housing 10. The upper quadrant of the hemispherical shape of the housing 10 presents a natural forward incline for positioning of a photovoltaic solar cell 16 at an upward/forward incline directly toward the sun. The integrally-molded square receptacle for the photovoltaic solar cell 16 is slightly offset forwardly from center for maximum exposure. Opposing through holes 12A, 12B are formed from front to back of the housing 10 to provide the option of permanent mounting by the provision of one or (preferably) at least two screws through the housing 10. Semi-permanent mounting may alternately be accomplished with mastic or adhesive films attached to the flattened back surface area (see FIG. 4) which is preferably defined by a removable battery cover 17 that conforms to a battery receptacle formed in the rear of housing 10.

With renewed reference to FIG. 2, a speaker grill 17 is formed in the lower quadrant of the hemispherical housing 10 by a plurality of evenly-spaced perforations through the ABS shell. In addition, an aperture is co-located at one side of the lower hemisphere for seating a protruding on/off detent switch 13 by which a user can deactivate the voice enunciator circuit. An elliptical-shaped convex transparent lens 20 is seated flush in the elliptical frontal aperture 15, and the convexity of lens 20 conforms to the semi-spherical contour of the housing 10 to maintain a uniform overall shape. The specific elliptical shape of housing 10, the seamless integrally-molded form factor, and flush seating of conformal lens 20 in housing 10 greatly enhances the moisture-resistance of the system 2 and weatherability thereof by sealing the housing and protect the internal components including the IR sensor 18 and LED light sources 22 (described below) from the elements.

The lens 20 is made from an infrared transparent plastic material and is positioned within the housing aperture to direct and focus thermal radiation to the infrared sensor 18 from a wider field of view than would be possible with a non-refracting cover in the aperture 15. The lens 20 is preferably made from polyethylene (HDPE) which is largely transparent to IR radiation in the range of 5 to 15 micrometers typically emitted by humans, and highly translucent to visible light. The lens 20 is a Fresnel type lens which is a plano-convex lens defined by inclined surfaces or "grooves" which allow the bulk of the lens to be collapsed into shallower profile while retaining its optical characteristics. Such a lens is lighter and less prone to absorption losses than a full depth lens and, when constructed of polyethylene, is relatively flexible and durable so as to readily seal the aperture 15.

Figure 5:
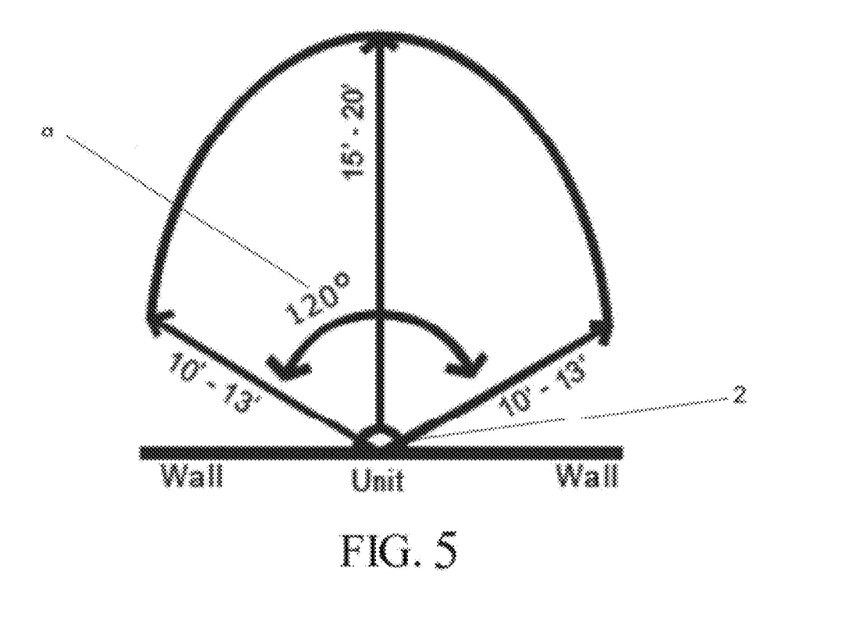
FIG. 5 is a diagram of the arcuate sensor sweep area of a system according to the present invention.

FIG. 5 is a plan view illustrating the field of coverage for a preferred embodiment in which the Fresnel lens 20 collects infrared light from a monitored arc of included angle α which, in the preferred embodiment spans 120°. The IR sensor has a maximum sensing distance ranging from approximately 15-20 feet at the midpoint of the monitored arc to approximately 10-13 feet at the periphery, depending on the selected lens and varying with environmental conditions. Alternate lenses 20 can be utilized to expand the monitored arc α to substantially 180° but with a diminished sensing distance.

The Fresnel grooves are interrupted by integrally-molded lenses/windows 19 in lens 20 to ensure that light from the LED's 22 (described below) is not obscured or overly dispersed. The lens 20 is preferably formed as an integrally-molded component including both the Fresnel grooves and windows 19 such that the IR sensors 18 and LED light sources 22 can share the aperture 15 with the lens 20 further serving to seal the housing and protect the sensors and light sources from the elements. Window 19 may be optically refractive (i.e. a lens) so as to shape the wave front emitted from the LED light sources or maybe simply transparent. Where window 19 is a refractive lens the LED light source is preferably positioned within the housing 10 at the focal point of the lens.

The infrared (IR) sensor 18 is positioned behind the lens 20 and is preferably a passive infrared (PIR) sensing device capable of detecting within its field of view the approach or movement of objects (such as a person, animal or vehicle) emitting thermal energy in the form of infrared radiation. The PIR motion sensor 18 is preferably a pyroelectric device that detects motion by measuring changes in the thermal energy levels emitted by surrounding objects but requiring very little power (600 mAh/60 hours). One or more pyroelectric sensor elements within IR sensors 18 are made of a crystalline material that generates an electric charge when exposed to infrared radiation. A change in the amount of infrared radiation striking the crystalline element(s) due to the appearance or movement of a thermally emitting object changes the voltage generated by the crystal or the difference between the voltages generated between crystals where more than one crystal is used.

The change in absolute or differential voltage is amplified and measured to identify motion and generate an indicative detection signal. Differential IR motion detectors utilizing more than one pyroelectric sensor elements are less prone to false alerts due to changes in ambient IR conditions affecting all elements equally (such as a flash of lightening). Thus, motion can be detected by identifying changes in electrical properties that result from sudden change in the surrounding IR patterns. When motion is detected the PIR sensors 18 output a signal to an internal logic controller (described below).

An LED array comprising a plurality of LED light sources 22 commonly-mounted on a circuit board is positioned directly behind the lens 20. Two LED light sources are provided in the preferred embodiment with one each position behind the two windows 19 within the lens 20. An LED array packaged on a circuit board and operable from 3 VDC is preferred, and is commercially available from a variety of companies including Lumex, Inc.™ Although the LED light sources 22 may preferably provide blue light, they may alternatively provide light at one or more colored wavelengths or white light. A specular mirror reflector may preferably be positioned behind the LED light sources 22 within the housing aperture to maximize the emissive efficiency of the light sources and provide the maximum possible ambient light in the protected area in response to intrusion detection.

Speaker grill 17 is characterized by a series of holes or apertures in the housing 10 order to permit audibalization of an alarm signal by a piezoelectric speaker or horn 26 situated within the housing 10, and as described below. Additionally, the pushbutton switch 13 provided on the downward facing horizontal portion of the housing 10 is a push-button detent switch encased in a rubber helmet protruding from the housing 10 to enable the user to easily toggle between a sound mode (in which an audible/voice alarm is sounded) and a silent mode (no audible alarm) when the housing 10 is mounted overhead.

Figure 6:
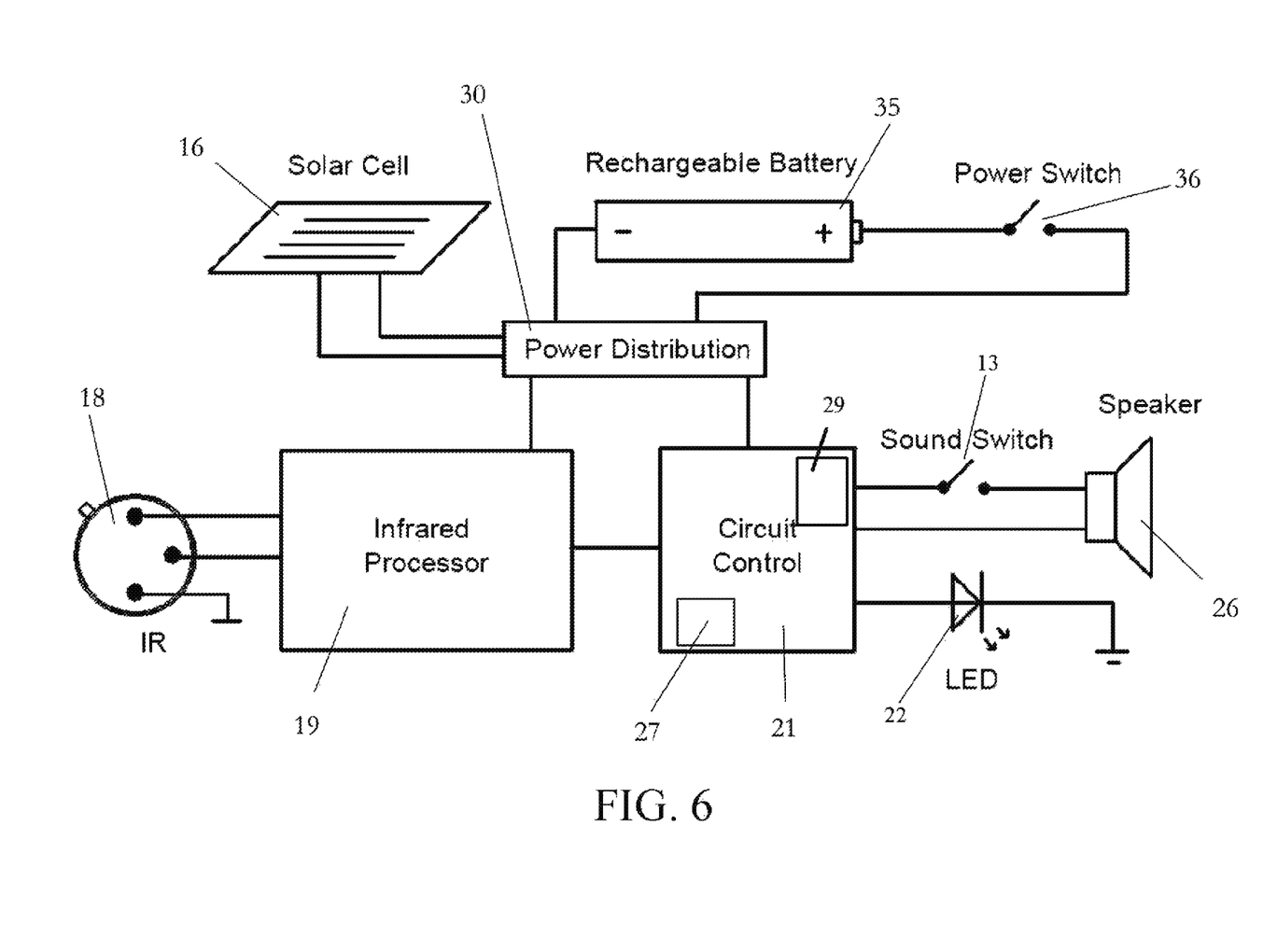
FIG. 6 is an electrical block diagram of the components of a system according to the present invention.

With reference to FIG. 6, a schematic block diagram of the system 2 components within the housing 10 is depicted. Solar cell 16 is a commercially-available 1"×1" photovoltaic cell externally seated and adhered to the housing 10 and electrically connected via power distribution module 30 to a rechargeable battery 35 (preferably two 1.5V AAA nickel metal-hydride batteries providing a combined 600 milliamp-hours). Rechargeable battery 35 is connected to photovoltaic cell 16 through an inline diode and is recharged directly by the photovoltaic cell 16 during periods in which the cell 16 is exposed to direct sunlight (40,000-100,000 lux). The solar cell 16 is capable of fully recharging the rechargeable battery in 8 hours of direct sun exposure, and the diode prevents overcharging as is well-known. A blocking diode may also be utilized as is known to prevent battery discharge.

Figure 7:
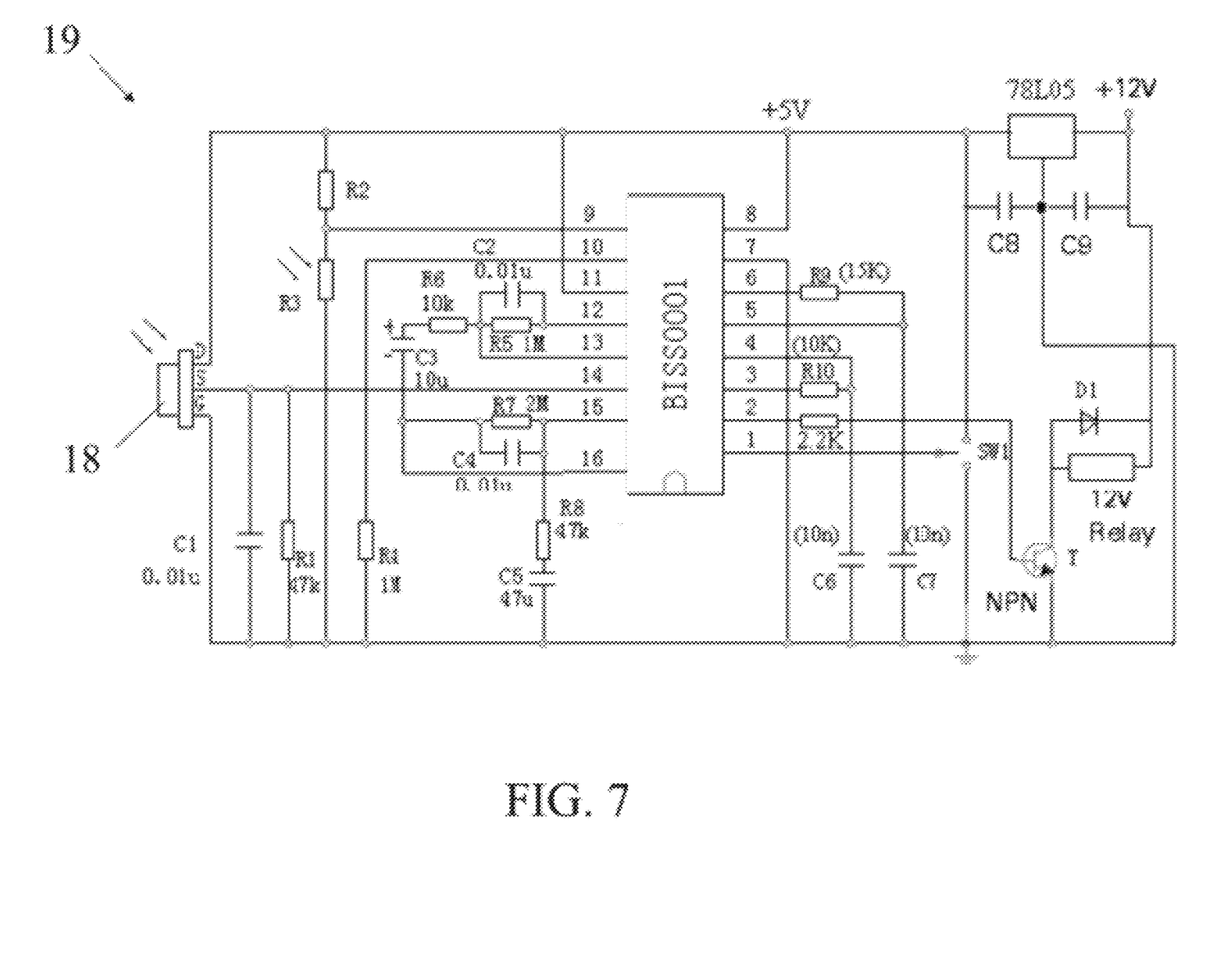
FIG. 7 is an electrical circuit diagram of the components of an infrared sensing component of a system according to the present invention.

The rechargeable battery 35 is capable of powering the IR sensor 18 for 60 hours of monitoring time between charges. Thus, a fully charged system 2 is capable of monitoring an area for five consecutive twelve hour nights with little or no available direct sunlight for charging during the intervening days. Monitoring time is reduced by power expended to illuminate/alarm the monitored area after a motion detection event. A power switch 36 is provided to disconnect the battery from the system when operation is not desired, and switch 36 may be mounted inside the battery compartment shown in FIG. 2. Also provided is a photocell 27 which indicates ambient light conditions to the circuit controller 21 and prevents the controller 21 from activating the light source/alarm during daylight hours in order to minimize the battery charging time and maximize the area monitoring time. Photocell 27 is preferably mounted behind lens 20 where it is exposed to ambient visible light and may be comprised of a photosensitive resistor (R3 in FIG. 7) that has low resistance in strong ambient light.

The PIR sensors 18 described above are connected to an infrared processor 19 which identifies the change in electrical charge from sensor 18 and signals the circuit controller 21 that motion has been sensed. An exemplary circuit diagram for the infrared processor 19 is provided in FIG. 7.

Circuit controller 21 is also electrically connected via the power distribution module 30 to the battery 35 and energizes the LED light sources 22 in response to a motion detection signal from the IR processor 19 thereby illuminating the monitored area and calling attention to the fact of the intrusion and detection. Circuit controller 21 preferably flashes the LED light sources 22 in an on-off-on pattern for maximum notoriety to both the intruder and homeowner or passers by. Circuit controller 21 further energizes the speaker 26 circuit when motion is detected. The speaker 26 audiblizes a warning that motion has been be detected. Circuit controller 21 includes on-board memory 29 storing a digital sound clip file (way, mp3 or otherwise) comprising a combination of an alarm sound interspersed with a voice-enunciated warning such, for example, "WARNING . . . THIS AREA IS MONITORED." In response to a motion detection signal from the IR processor 19 the circuit controller 21 broadcasts a combination of an audible alarm in the form of a siren or horn type noise, interspersed with a human voice emulation or recording stating authoritatively that intrusion has been detected and/or the area is monitored, in attempt to scare off the intruder.

The circuit controller 21 maintains power to the light source and audible alarm for a fixed time, preferably approximately 15 seconds, before disconnecting the power source until the next motion detected signal. Additionally, when the system 2 is turned on the circuit controller 21 introduces a short (3 second) delay before a motion detection signal is emitted, thereby giving the homeowner time to vacate the monitored area.

It should now be apparent that, once armed, the system 2 will detect any person entering a monitored area during the nighttime when the infrared energy emitted from the intruder's body is focused onto the PIR sensors 18. As the intruder moves, so does their heat signature, and this moving hot spot causes the PIR sensors 18 to signal an intrusion to the circuit controller 21, which then emits the combination light/siren/voice alarm to effectively deter and scare them away. The particular combination of a siren/horn-type alarm with periodic voice warnings, plus flashing high-intensity LED lights is a far more effective warning and deterrent than prior art devices. With no maintenance whatsoever, the system 2 keeps intruders away, protects home and family, and protects property.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims and may be used with a variety of materials and components. This application is therefore intended to cover any variations, uses, or adaptations of the invention using its general principles. Further, this application is intended to cover such departures from the present disclosure as come within known or customary practice in the art to which this invention pertains.

We claim:

1. A solar powered light and alarm system comprising:
    a unitary semi-ellipsoidal housing having a planar back wall conjoined to an ellipsoidal front wall, said front wall having an aperture there through and a transparent lens seated within said aperture, a first surface area of said lens comprising a Fresnel surface area for light gathering and a second surface area of said lens comprising a smooth surface area for light transmission, said housing with lens defining a fully-enclosed hollow interior;
    a power distribution circuit, said power distribution circuit further comprising,
        a photovoltaic cell affixed to the front wall of said housing so as to be substantially horizontal,
        a rechargeable battery within the interior of said housing and electrically connected to said photovoltaic cell for receiving and storing an electrical charge generated thereby, and
        a first switch for disconnecting said battery from said system;
    a passive infrared (PIR) sensor seated in the interior of said housing behind the Fresnel surface area of said lens, said PIR sensor identifying changes in ambient infrared radiation indicative of movement;
    a circuit controller within the interior of said housing electrically connected to said PIR sensor and to said power distribution circuit;
    a light source seated within the interior of said housing behind the smooth surface area of said lens and electrically connected to said circuit controller;
    a speaker and speaker driver within said housing electrically connected to said circuit controller via a second switch for providing an audible alarm; whereby said circuit controller activates said light source and said audible alarm on receipt of a signal from said PIR sensor indicating that motion has been sensed.

2. The solar powered light and alarm system of claim 1 further comprising a photocell electrically connected to said circuit controller for generating a signal indicative of ambient daylight conditions whereby said circuit controller inhibits operation of said system during daylight hours.

3. The solar powered light and alarm system of claim 1 wherein the aperture in the front wall of said housing is elliptical, and said lens is elliptical.

4. The solar powered light and alarm system of claim 1 wherein said lens is made from polyethylene.

5. The solar powered light and alarm system of claim 1 wherein said rechargeable battery provides 1.2 volts.

6. The solar powered light and alarm system of claim 1 wherein said light source comprises at least one light emitting diode (LED).

7. The solar powered light and alarm system of claim 6 wherein said light source comprises two LEDs.

8. The solar powered light and alarm system of claim 7 wherein said two LEDs comprise a red LED and a blue LED.

9. The solar powered light and alarm system of claim 1 wherein said light source comprises at least one flashing light emitting diode (LED).

10. The solar powered light and alarm system of claim 1 wherein said circuit controller further comprises a timing element and wherein said controller deactivates said light source and said audible alarms after a period of time has elapsed.

11. The solar powered light and alarm system of claim 1 wherein said audible alarm is a human voice command.

* * * * *